Patented Jan. 16, 1923.

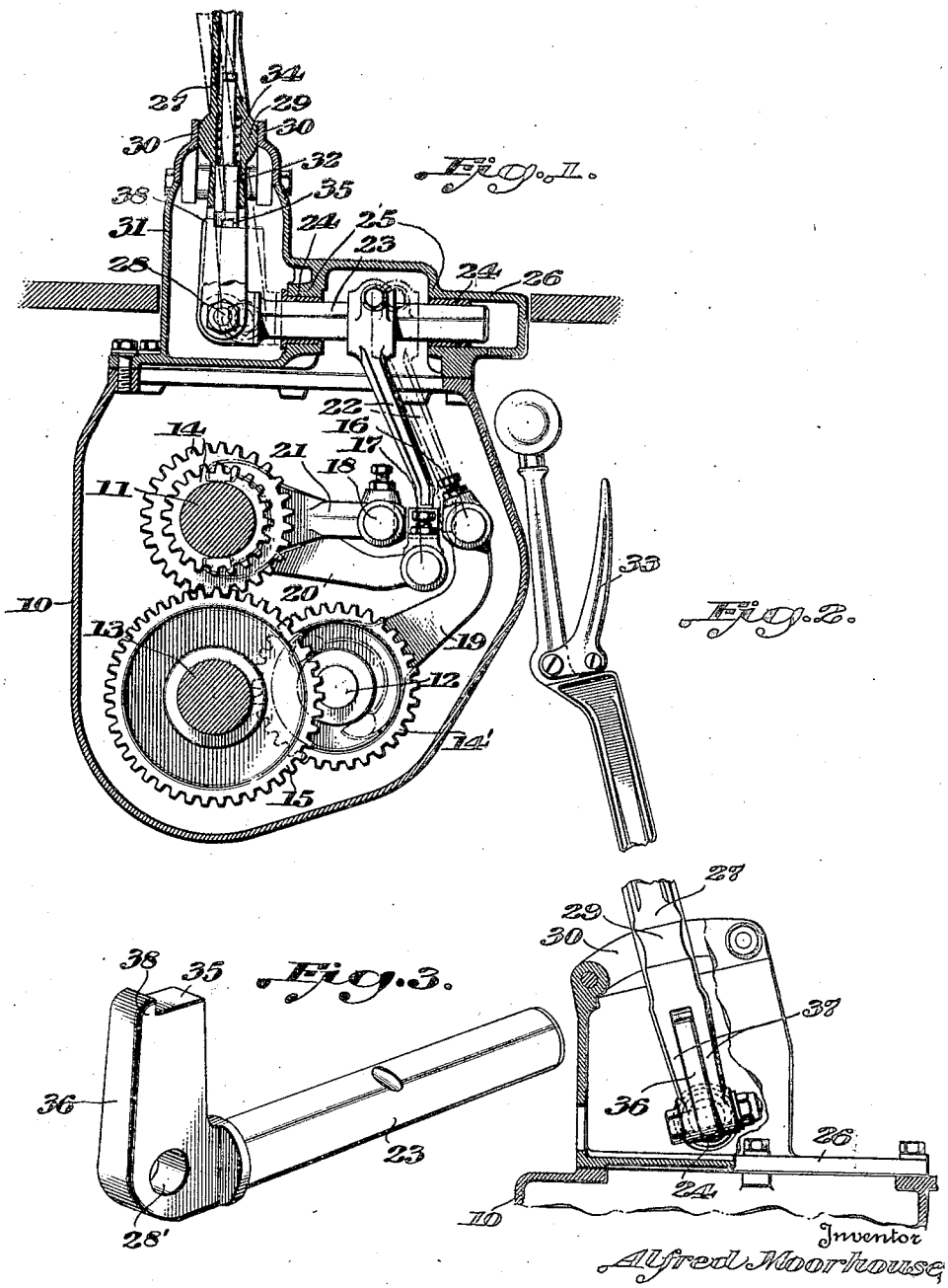

1,442,533

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed August 26, 1920. Serial No. 406,147.

*To all whom it may concern:*

Be it known that I, ALFRED MOORHOUSE, a citizen of the United States, and resident of Detroit, Wayne County, State of Michigan, have invented certain new and useful improvements in Motor Vehicles, of which the following is a specification.

This invention relates to motor vehicles and more particularly, to gear shifting mechanism therefor.

The gear shifting mechanism in connection with which my invention has been worked out belongs to that type in which the gears are shifted by means of longitudinally movable shifting elements or bars, these bars being engaged and moved by means of an arm which in turn is actuated by a shifting lever.

In transmission mechanism of this type it is often desirable to employ three different shifting elements or bars, as, for instance, in the case where forward speeds are obtained by the movement of two of the bars and the reverse drive is obtained by means of the movement of the third bar. When these bars are shifted by means of a lever of the ordinary construction, it is very difficult to properly determine the location of the lever and arm actuated thereby with respect to the shifting bars, since the lever at one extreme of movement usually positions the arm in engagement with one of the bars and in the other extreme position of movement positions the bars in engagement with a second shifting bar, but no means is provided for positively positioning the lever and arm in engagement with the third shifting bar.

One of the objects of the invention is, therefore, to facilitate the shifting of the transmission gears of a motor vehicle.

Another object of the invention is to provide means, in connection with a gear shifting lever, for positively determining the location of the lever with respect to more than two shifting elements.

Another object of the invention is to provide gear shifting mechanism so constructed that the actuating member may be located a considerable distance from the gear transmission case.

Further objects of the invention will appear from the following specification taken in connection with the drawings which form a part of this specification, and in which:

Fig. 1 is a vertical sectional view illustrating gear shifting mechanism constructed in accordance with my invention;

Fig. 2 is a side elevational view, partly in section, of the gear shifting lever and support therefor; and Fig. 3 is a perspective view on an enlarged scale, illustrating the construction of the connecting member which connects the lever to the arm by means of which the longitudinally movable shifting elements or bars are actuated.

In Fig. 1 I have illustrated the transmission case 10 of a motor vehicle, this case having journaled therein a shaft 11 which is connected in the usual manner (not shown) to the power shaft in the motor, and a pair of intermediate or transmission shafts 12 and 13 are also journaled in the transmission case. These three shafts 11, 12 and 13 have gearing 14, 14' and 15 mounted thereon and so constructed and arranged as to give the desired changes of speed and to reverse the drive.

In the embodiment of the invention illustrated, there are shown three longitudinally movable shifting elements or bars 16, 17 and 18, these bars being slidably mounted in supports carried by the transmission case and having mounted thereon, respectively, gear shifting yokes 19, 20 and 21.

In the transmission mechanism illustrated, the shifting of the gearing carried by the shaft 11 and controlled by yokes 20 and 21 and shifting bars 17 and 18 gives four different forward speeds, and the shifting of the bar 16 and yoke 19 throws the driving connection into reverse.

The longitudinal movement of the bars 16, 17 and 18 is controlled by a single arm 22 mounted on a shaft 23, the shaft being rotatably and slidably mounted in bushings 24 carried by bearings 25 formed in the cover plate 26 for the transmission case.

The movement of the shaft 23 is, in turn, controlled by means of a gear shifting lever 27 which is pivoted on a bolt 28, which passes through an aperture 28' in the shaft 23, and the lever is provided intermediate its ends with a spherical portion 29 which forms one fulcrum of the lever and about which the lever is adapted to rock between segmental plates 30 formed on or secured to a vertically extending portion 31 of the cover 26. When two longitudinally movable shifting bars are employed, it will be evident that the arm for shifting these bars may be so connected to the lever that the movement of this lever about its fulcrum to its two extreme positions will positively determine the location of the arm with respect to the two shifting bars.

When, however, three shifting bars are employed, it becomes necessary to provide additional means for determining the three positions of movement of the lever.

In the embodiment of the invention illustrated, this is accomplished by means of a longitudinally reciprocable pawl or plunger 32 which is slidably mounted on the lever 27 and is controlled by means of a hand actuated bell crank lever 33 pivoted to the upper portion of lever 27. A spring 34 normally retains the pawl in its lower position of movement. The lower end of the pawl 32 engages the upper surface 35 of an upwardly extending lug 36 formed on or secured to the free end of the shaft 23, the lower portion of the lever 27 being bifurcated, as shown at 37, and embracing the lug 36. The pivot bolt 28 extends through bifurcations 37 and through the lower portion of the lug or shaft extension 36. As illustrated in Figs. 1 and 3, the upper surface 35 of the lug 36 is formed with an extension 38 which forms a stop and limits the movement of the lever 27 when the plunger 32 is in its normal or lower position. The lever 27, shaft 23 and arm 22 are so connected that the movement of the lever permitted when the plunger 32 is in its lower position and limited by the projection 38 enables the operator to positively position the arm 22 in engagement with the shifting bars 17 and 18, it being understood that when the plunger 32 is in engagement with the projection 38, as shown in full line in Fig. 1, the arm 22 engages the shifting bar 17, and when the lever is swung in a clockwise direction or a direction opposite to that shown in dotted lines in Fig. 1, the arm 22 engages the shifting bar 18.

When, however, the operator desires to throw into reverse, or to the dotted line position shown in Fig. 1, it is necessary to lift the plunger 32 by means of the bell crank lever 33 and to swing the lever to the dotted line position in which the arm 22 engages the shifting bar 16. It will, of course, be understood that when the arm 22 has been positioned in engagement with the proper shifting bar, the shifting bar may be moved longitudinally by rotating or rocking the lever and arm on the axis of the shaft 23.

From the above description, it will be seen that I have provided simple and efficient means for shifting the gears of a motor vehicle and for positively determining the position of the actuating mechanism with respect to the shifting elements or bars.

It will also be evident that inasmuch as the shifting arm which engages the bars is offset with respect to the shifting lever, the position of the lever may be changed without in any manner affecting the operativeness of the device, and therefore this lever may be positioned wherever convenient for the operator.

Although one specific embodiment of the invention has been illustrated and described, it will be understood that the invention is capable of modification and that modifications and changes in the construction and the arrangement of the various cooperating parts may be made without departing from the spirit or scope of the invention as expressed in the following claims.

Having described my invention, what I claim and desire to secure by Letters Patent is:—

1. Gear shifting mechanism including, in combination, a lever, a longitudinally movable, rotatable shaft pivotally connected to said lever, an arm secured to said shaft and adapted to selectively engage gear shifting elements, and means on said shaft and said lever for positively positioning said arm in engagement with any one of three shifting elements.

2. Gear shifting mechanism comprising, in combination, a shaft, a plurality of shifting bars, a shifting member carried by said shaft and adapted to engage said bars, a lever pivotally connected to said shaft, a pawl carried by said lever, and means carried by said shaft adapted to engage said pawl and limit the movement of said lever with respect to said shaft.

3. Gear shifting mechanism comprising in combination, a plurality of shifting bars, a member adapted for selective engagement with said bars, a rotatable and longitudinally movable shaft connected to said member, a lever pivotally connected to said shaft, a pawl carried by said lever, and a stop on said shaft adapted to engage said pawl to limit the movement of said lever relative to said shaft in one direction.

4. Gear shifting mechanism comprising in combination, a plurality of shifting bars, a member adapted for selective engagement with said bars, a rotatable and longitudinally movable shaft connected to said member, manual means for operating said shaft, and connections between said means and shaft, including releasable means, permitting movement of said manual means relative to said shaft in one direction only.

5. Gear shifting mechanism comprising in combination, a plurality of shifting bars, a member adapted for selective engagement with said bars, a rotatable and longitudinally movable shaft connected to said member, a lever having its end pivoted to said shaft on an axis transverse to the axis thereof and having a fulcrum movable in an arc concentric with said shaft, a member rigid with said shaft having a shoulder, and a pawl on said lever engaging said member and shoulder to limit the pivotal movement of said lever relative to said shaft in one direction.

6. Gear shifting mechanism comprising in combination, a plurality of shifting bars, a member adapted for selective engagement with said bars, a rotatable and longitudinally movable shaft connected to said member and having an elbow at one end, a lever having a bifurcated end embracing said elbow and pivoted thereto, said lever having a fulcrum movable in an arc concentric with said shaft, and a pawl on said lever engaging the end of said elbow, said end having a shoulder abutting said pawl to limit the pivotal movement of said lever relative to said shaft in one direction.

7. Gear shifting mechanism comprising in combination, a plurality of shifting elements, a member adapted for selective engagement with said elements, a rotatable and longitudinally movable shaft connected to said member, a lever pivoted to said shaft on an axis transverse thereto and having a fulcrum movable in an arc concentric with said shaft, and releasable means on said shaft and lever limiting the pivotal movement of said lever relative to said shaft.

8. Gear shifting mechanism comprising in combination, a plurality of shifting elements, a member adapted for selective engagement with said elements, a rotatable and longitudinally movable shaft connected to said member, a lever for operating said shaft, and connections between said lever and shaft including a releasable stop permitting movement of said lever relative to said shaft in one direction only.

In testimony whereof I affix my signature.

ALFRED MOORHOUSE.